June 30, 1953  R. A. McCONNELL  2,644,154
MOVING OBJECT INDICATION RECEIVER CIRCUIT
Filed Dec. 10, 1945  2 Sheets-Sheet 1

INVENTOR.
ROBERT A. McCONNELL
BY
William D. Hall
ATTORNEY

Patented June 30, 1953

2,644,154

UNITED STATES PATENT OFFICE 2,644,154

MOVING OBJECT INDICATION RECEIVER CIRCUIT

Robert A. McConnell, Cambridge, Mass., assignor, by mesne assignments, to the United States of America as represented by the Secretary of War Application December 10, 1945, Serial No. 634,077

4 Claims. (Cl. 343—9)

The present invention relates to radio receivers employed in radio object locating systems of the moving target indication type, and it relates more particularly to means for injecting reference oscillations into a receiver having a generally logarithmic response characteristic.

A system of the above type is adapted to distinguish moving objects from fixed objects by the character of video pulses derived from object returned echo pulses. In general, the video pulses are obtained by additively combining object returned echo pulses having a given carrier frequency with locally generated continuous wave reference oscillations of the same carrier frequency and having a fixed phase with respect to the carrier wave of each transmitted exploratory pulse. The resultant combination is then detected to provide video pulses, and moving objects are manifested by video pulses having a cyclical variation in amplitude whereas stationary objects are manifested by video pulses having a substantially non-varying amplitude. The basic principles of such a system are more fully described in Patent No. 2,535,274, issued on December 26, 1950, to Robert H. Dicke and entitled "Moving Target Indicator," Serial No. 590,052, filed April 24, 1945.

In accordance with the above-identified copending application, a radio object-locating system that distinguishes fixed objects from moving objects includes a transmitter and an associated receiver, the transmitter providing successive short duration, high carrier-frequency exploratory pulses of radiant energy, synchronized in fixed phase relation to reference oscillations provided locally at the receiver. An essential characteristic of these reference oscillations is that they have a fixed phase with respect to the phase of the exploratory pulses. The reference oscillations may consist of locally generated continuous wave oscillations synchronized in phase with the exploratory pulses, or they may comprise any other oscillations having this characteristic. If desired, the reference oscillations, or timing wave as they are sometimes called, may consist of an interrupted continuous wave train initiated by the transmitted pulse and acting in such a manner as to provide oscillations starting in fixed phase with each transmitted pulse, lasting for a period of time, and being damped out just before the start of the next succeeding pulse.

The radiant energy contained in the echopulses returning from an object will have a certain phase relation with respect to the reference oscillations, the relative phase between the two being dependent upon the instantaneous range of the object. In the case of a moving object (where the range is changing), said relative phase will vary from pulse to pulse.

If the echo-pulses are algebraically combined with the reference oscillations, they will combine in such a manner as to reinforce or oppose one another to a varying degree in a relationship depending upon the relative phase between the two. By detecting the resulting combination, video pulses may be obtained, the amplitude of said video pulses being dependent upon said relative phase. As the object moves, the phase of successive echo-pulses relative to the reference oscillations changes, and the amplitude of the resultant successive video pulses varies in a periodic manner.

As disclosed in a copending application of Robert A. McConnell entitled "Communication System," Serial No. 634,076, filed December 10, 1945, certain video pulses corresponding to stationary objects have undesired fluctuations, the amplitude of said fluctuations being substantially proportional to the amplitude of the total received echo pulses. These undesired fluctuations thus appear, and falsely indicate the presence of a moving target on the screen of the viewing oscilloscope which is a component of the radio object locating system. These undesired fluctuations may be removed by employing a receiver which has a substantially linear response characteristic for signals below a predetermined amplitude, and a substantially logarithmic response characteristic for echo signals greater than said predetermined amplitude. This is sometimes known as a linear-logarithmic characteristic. A radio receiver having such a characteristic may be constructed by employing logarithmic amplifier stages of the character disclosed in Patent No. 2,577,506, issued on December 4, 1950, to Logan M. Belleville and entitled "Amplifier," Serial No. 604,035, filed July 9, 1945, some of the particulars of which will be elaborated on hereinafter.

It is an object of the present invention to provide means for injecting continuous wave reference oscillations in a receiver having a generally logarithmic response characteristic.

The invention, however, will be more fully understood from the following detailed description when taken into consideration with the accompanying drawing in which.

Figure 1:
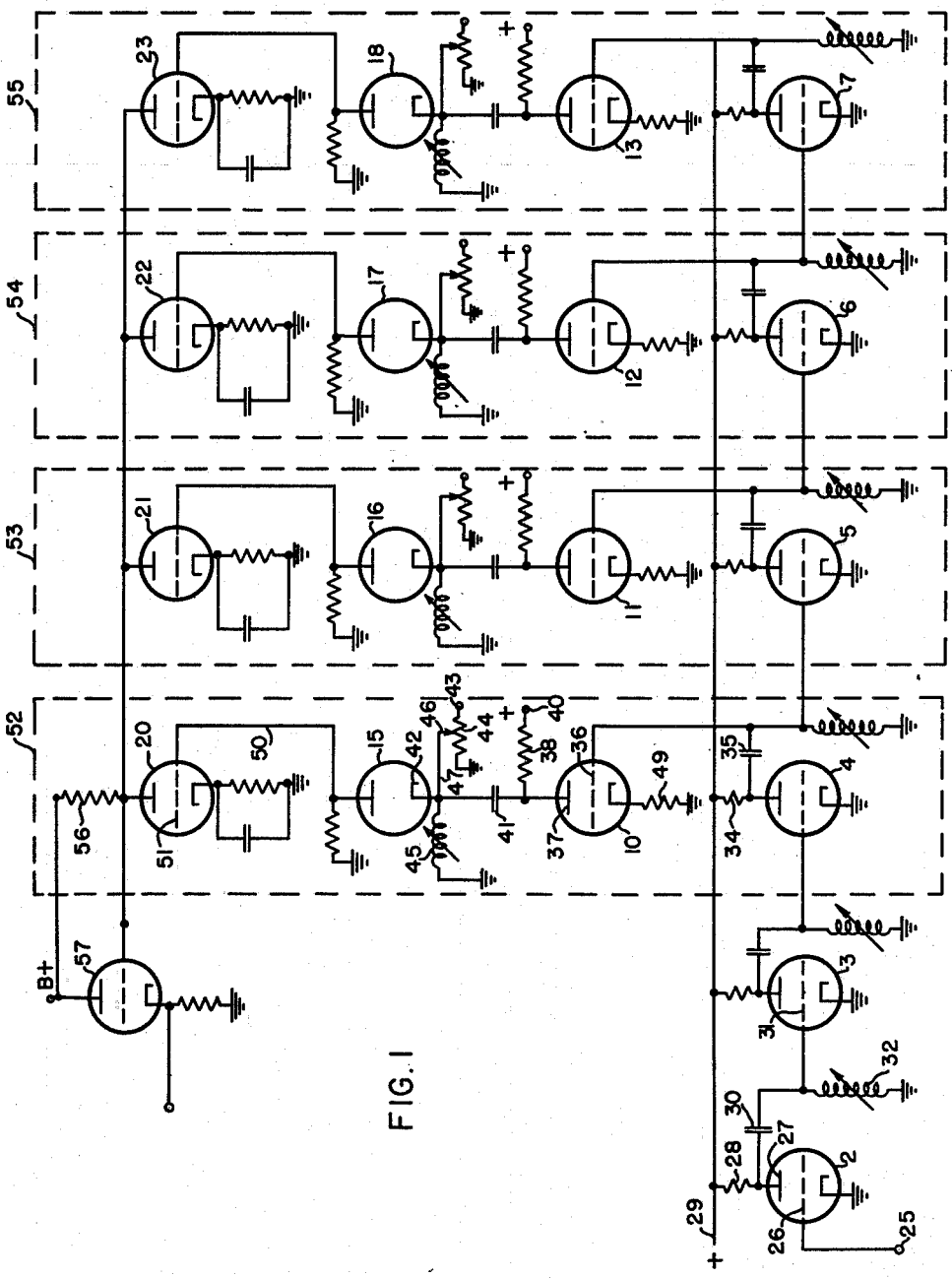
Fig. 1 is a schematic diagram of one embodiment of the present invention.
Figure 3:
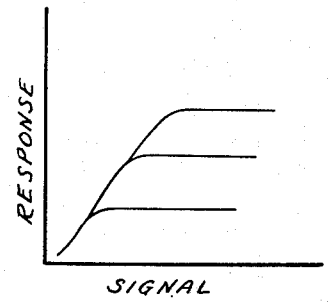
Fig. 3 is a graphical representation of the response characteristic of the receiver of the circuit shown in Fig. 1.

Reference is made to Fig. 1 wherein vacuum tubes 2 through 7, inclusive, represent the intermediate frequency amplifier stages of a receiver having a response characteristic which is partly linear and partly logarithmic, depending on the received signal amplitude (linear-logarithmic receiver), and vacuum tubes 10 through 13, inclusive, represent buffer amplifier stages. As explained in the aforementioned application of Logan M. Belleville, in which a linear-logarithmic amplifier is described, three successive I. F. stages may each have, by way of example, an amplification of 10; thus, it can be seen that they will form, in this case, the equivalent of a voltage divider, the three I. F. output voltages being in the ratio of 100:10:1. When the three outputs are respectively connected to three amplifiers having equal amplification characteristics, an equal saturation point, and a common output load, the response resulting as an output from three such amplifiers will be as illustrated in Figure 3. It will be seen therefrom that an output will be obtained which is proportional to the logarithm of the input and the base of the logarithm will be determined by the ratio of the gains of the respective successive amplifying stages. Vacuum tubes 15 through 18, inclusive, are detector stages and vacuum tubes 20 through 23 are video amplifier stages.

Echo pulses having an intermediate carrier frequency are applied to input terminal 25 and thence to control grid 26 of vacuum tube 2. Vacuum tube 2 and the associated circuit elements comprises a conventional intermediate frequency amplifier, wherein anode 27 is connected through a load impedance 28 to a suitable source of positive potential 29. The amplified output developed across load resistance 28 is then applied through capacitor 30 to control grid 31 of vacuum tube 3. A conventional tuned circuit 32 is associated with the output circuit of vacuum tube 2. The succeeding I. F. stages including vacuum tubes 3, 4, 5, 6 and 7 are similar to that described in connection with the stage employing vacuum tube 2.

Consider now the amplified echo pulse signal developed across load resistance 34 of vacuum tube 4. This signal is applied through capacitance 35 to control grid 36 of buffer vacuum tube 10. Anode 37 of said vacuum tube is connected through load resistance 38 to a suitable source of positive potential 40, and the output developed across said load resistance is applied through capacitance 41 to cathode 42 of detector tube 15. Likewise applied to cathode 42 are continuous wave reference oscillations. In order to readily control the amplitude of these oscillations they are applied to terminal 43 and thence developed across potentiometer 44. A variable inductance 45 is connected in shunt with said potentiometer and may be adjusted to provide, in conjunction with stray capacitance, a high impedance to the pulse carrier frequency. The movable arm 46 of potentiometer 44 is adjustable to predetermine the amplitude of the reference oscillations applied through connection 47 to cathode 42.

In view of the foregoing, it is evident that buffer amplifier 10 isolates the point of reference oscillations injection (cathode 42) from the intermediate frequency stage including vacuum tube 4. In order to maintain a linear mutual characteristic curve for this buffer amplifier, negative feedback is provided by means of resistance 49.

Reference oscillations and the intermediate frequency echo pulses are thus combined at cathode 42 of detector tube 15, and the resultant combination is then detected, and applied by means of connection 50 to control grid 51 of video amplifier 20. Collectively, vacuum tubes 4, 10, 15, 20 and the associated circuits may be referred to as stage 52. The remaining circuits then may be conveniently referred to as stages 53, 54 and 55, each being similar to stage 52. They all cooperate to provide a characteristic which is in part linear and in part logarithmic as disclosed in the heretofore referred to copending application of Logan M. Belleville. In accordance with the teachings of said Belleville application, if a logarithmic output to the base 10 is desired, amplifiers 4, 5, 6, and 7 must respectively have amplification factors of 10; their respective outputs then will have the ratio of 1:10:100:1000. The outputs from amplifiers 4, 5, 6, and 7 are respectively coupled through buffers 10, 11, 12, and 13, and then respectively through detectors 15, 16, 17, and 18 to video amplifiers 20, 21, 22, and 23. Video amplifiers 20, 21, 22, and 23 have equal amplification factors and saturation points. The output from video amplifiers 20, 21, 22 and 23, inclusive, are combined across common load resistance 56 and thence applied as a logarithmic input to an output amplifier 57.

Figure 2:
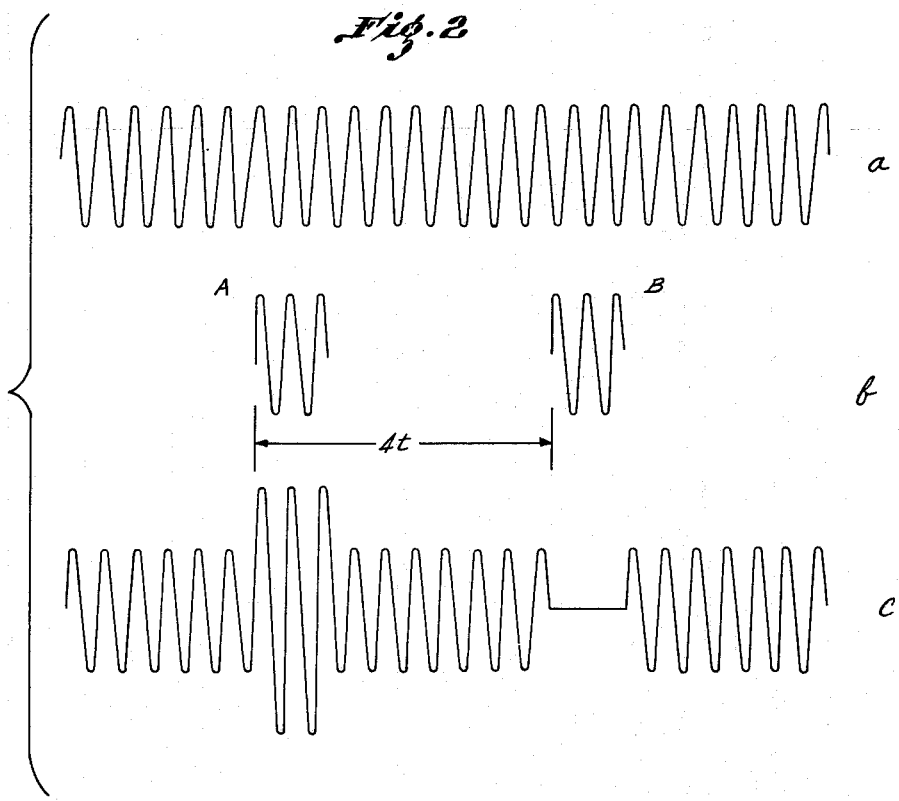
Fig. 2 is a diagrammatic representation of the phase relations of certain wave forms which occur in radio object-locating systems of the character herein described.

The aforementioned phase relations will be more fully understood by reference to Fig. 2 where particular emphasis is directed to the phase relationships, rather than to an accurate pictorial representation of the actual radio frequency waveforms. In Fig. 2(a), the wave train shown represents the locally generated reference oscillations which are synchronized to the transmitted pulses. In Fig. 2(b) an echo-pulse of radiant energy reflected by a moving object is represented by wave train A, and the position of a second echo-pulse reflected by the same object at a time $t$ later is represented by wave train B. Fig. 2(c) shows the algebraic combination of the reference oscillations of Fig. 2(a) and the echo-pulses of Fig. 2(b). From Fig. 2(c) it is apparent that wave train B, when combined with the reference oscillations totally opposes said reference oscillations, whereas wave train A, when so combined, totally reinforces said reference oscillations.

It will be apparent that as an object moves, echo-pulses such as represented by short wave trains A and B will have various other phase relationships with respect to the reference oscillations. As a result, certain echo-pulses will neither totally reinforce nor totally cancel the reference oscillations, and combination oscillations will be present in each case. The amplitude of oscillation is, of course, dependent upon the phase relation between the reference oscillations and the echo-pulse.

By combining a plurality of echo-pulses from a particular moving object with the synchronized reference oscillations, and continuously detecting the resultant combination, a plurality of video pulses may be obtained whose amplitudes vary in a periodic manner. The modulation envelope of such a plurality of video pulses is substantially sinusoidal, and it has a frequency that is a function of the object velocity.

An outstanding advantage of injecting the continuous wave reference oscillation input between the buffer amplifier and the detector is that the receiver is made less susceptible to overloading. Furthermore, by providing separate points of injection for each detector stage, the amplitude of the reference oscillation input may be controlled at will.

Due to phase reversal in the successive intermediate amplifier stages, it is evident that the pulse signals applied to buffer amplifiers 10 and 12 are 180° out of phase with signals applied to buffer amplifiers 11 and 13. Thus the reference oscillations applied to detector stages 15 and 17 should be 180° out of phase with respect to the reference oscillations applied to detector stages 16 and 18. In fact, under certain circumstances (in order to obtain other receiver response characteristics) it may be desirable to inject the continuous wave reference oscillations only into certain stages, for example, reference oscillations may be applied only to stage 55 or to stages 53 and 55.

Although there has been here described one embodiment of the present invention, it will be manifest to those skilled in the art that various changes and modifications may be made therein without departing from the invention. It is therefore aimed in the appended claims to cover all such changes and modifications as fall within the spirit and scope of the invention.

What is claimed is:

1. In a radio object locating system adapted to distinguish fixed objects from moving objects, a receiver having a response characteristic which is in part linear and in part logarithmic, said receiver including a plurality of intermediate frequency amplifier stages connected in cascade and having equal amplification factors, a plurality of buffer amplifier stages, each intermediate frequency stage being connected to a respective buffer amplifier stage, a plurality of detector stages, each buffer amplifier stage being connected to a respective detector stage, a plurality of video amplifiers substantially the same amplification characteristics and saturation points, each detector stage being connected to a respective video amplifier stage, an output load circuit in parallel with the output circuits of each of said video amplifier stages, means for applying object echo signals to the first of said cascaded intermediate frequency amplifier stages, means for applying reference oscillations to at least one of said detector stages whereby said reference oscillations and the amplified echo signals are combined in an additive manner and the resultant combination detected to provide video signals.

2. In a receiver for a moving target indication system, the combination comprising, a plurality of signal translating stages each stage comprising an intermediate frequency amplifier, said amplifiers being connected in cascade, means for applying pulses having an intermediate carrier frequency to the first of said cascaded amplifiers, a plurality of buffer amplifiers respectively connected to receive the outputs of the respective intermediate amplifiers, a plurality of detectors for the output of each of said buffer amplifiers and respectively connected thereto, a plurality of video amplifiers for the respective output of each of said detectors, means for applying a continuous wave reference oscillation to at least one of said detectors, whereby the point of reference wave injection is isolated from the intermediate frequency portion of each stage, and means for combining the outputs of each of said video amplifiers, the respective output voltages of successively connected intermediate frequency amplifiers forming to a geometric progression the ratio of which is at least 10.

3. In a receiver for a moving target indication system, the combination comprising, a plurality of stages, each stage comprising an amplifier for a given frequency range, said amplifiers being connected in cascade, a plurality of output amplifiers each respectively coupled to the respective outputs of said first named amplifiers, said output amplifiers having equal amplification characteristics, means for applying echo pulses having a carrier frequency within said range to the first of said cascaded amplifiers, at least one buffer amplifier, a detector for the output of said buffer amplifier, one of said cascaded amplifiers being coupled to its associated output amplifier by having its output coupled to the input of said buffer amplifier, the output of said detector being coupled to the input of said associated output amplifier, means for applying a continuous wave reference oscillation to said detector, whereby the point of reference wave injection is isolated from said one amplifier of said cascaded amplifiers, and means for combining the output of each of said output amplifiers, the respective output voltages of the cascaded amplifiers being proportional to a geometric progression.

4. In a receiver for a moving target indication system, means receptive of target echo signals and having a plurality of output circuits for deriving from said echo signals a plurality of output voltages having values such that they form a geometric progression, a plurality of amplifiers having a common load circuit and having substantially identical amplification characteristics, each of said amplifiers having its input coupled to a respective one of said plurality of output circuits, means coupled to the input of at least one of said amplifiers for adding reference voltage oscillations thereto, and at least one isolating means connected between said adding means and the one output circuit of the first named means that is associated with said one amplifier.

ROBERT A. McCONNELL.

References Cited in the file of this patent

UNITED STATES PATENTS

| Number | Name | Date |
|---|---|---|
| 2,403,625 | Wolff | July 9, 1946 |
| 2,408,742 | Eaton | Oct. 8, 1946 |
| 2,412,631 | Rice | Dec. 17, 1946 |
| 2,455,639 | Anderson | Dec. 7, 1948 |
| 2,467,670 | Hershberger | Apr. 19, 1949 |
| 2,479,568 | Hansen | Aug. 23, 1949 |
| 2,520,166 | Page | Aug. 29, 1950 |
| 2,535,274 | Dicke | Dec. 26, 1950 |